(12) United States Patent  (10) Patent No.: US 7,239,634 B1
Chakravorty  (45) Date of Patent: Jul. 3, 2007

(54) ENCRYPTION MECHANISM IN ADVANCED PACKET SWITCHING SYSTEM

(75) Inventor: Sham Chakravorty, McLean, VA (US)

(73) Assignee: Signafor, Inc., Dunn Loring, VA (US)

( * ) Notice: Subject to any disclaimer, the term of this patent is extended or adjusted under 35 U.S.C. 154(b) by 1116 days.

(21) Appl. No.: 10/172,008

(22) Filed: Jun. 17, 2002

(51) Int. Cl.
*H04L 12/56* (2006.01)
(52) U.S. Cl. .................... 370/392; 370/395.3; 370/397
(58) Field of Classification Search ..................... None
See application file for complete search history.

(56) References Cited

U.S. PATENT DOCUMENTS

| | | | |
|---|---|---|---|
| 6,490,292 B1 * | 12/2002 | Matsuzawa | 370/401 |
| 6,526,056 B1 * | 2/2003 | Rekhter et al. | 370/392 |
| 6,693,878 B1 * | 2/2004 | Daruwalla et al. | 370/235 |
| 6,795,431 B2 * | 9/2004 | Endo | 370/352 |
| 6,954,431 B2 * | 10/2005 | Roberts | 370/235 |
| 7,023,846 B1 * | 4/2006 | Andersson et al. | 370/389 |
| 7,023,851 B2 * | 4/2006 | Chakravorty | 370/392 |
| 7,065,095 B2 * | 6/2006 | Coden | 370/404 |
| 2002/0083344 A1 * | 6/2002 | Vairavan | 713/201 |

* cited by examiner

*Primary Examiner*—Chi Pham
*Assistant Examiner*—Soon D. Hyun
(74) *Attorney, Agent, or Firm*—McDermott Will & Emery LLP

(57) ABSTRACT

A packet switching system for switching packets over corporate networks and the Internet using Internet Protocol (IP) suite of protocols is provided with an encryption detecting unit that determines whether at least a section of a portion of an incoming packet allocated for Internet Protocol (IP) address fields comprises encrypted data. If the encrypted data is detected, a decrypting unit decrypts the encrypted data. A packet identifying unit detects a virtual connection identifier (VCID) marker indicating that a VCID is provided in the portion of the incoming packet allocated for IP address fields. A data extracting unit extracts the VCID from the decrypted data. For example, the data extracting unit may extracts original source and destination IP addresses, or a Quality of Service (QoS) field for identifying parameters of Quality of Service. A route processing engine determines a route for forwarding the packet, and a packet forwarding unit places the packet into a queue for transmission. An encrypting unit encrypts the VCID of packets transmitted to a network that uses virtual connection identifiers for switching packets.

25 Claims, 2 Drawing Sheets

Representative IPv4 Header Details for VIPS Packet

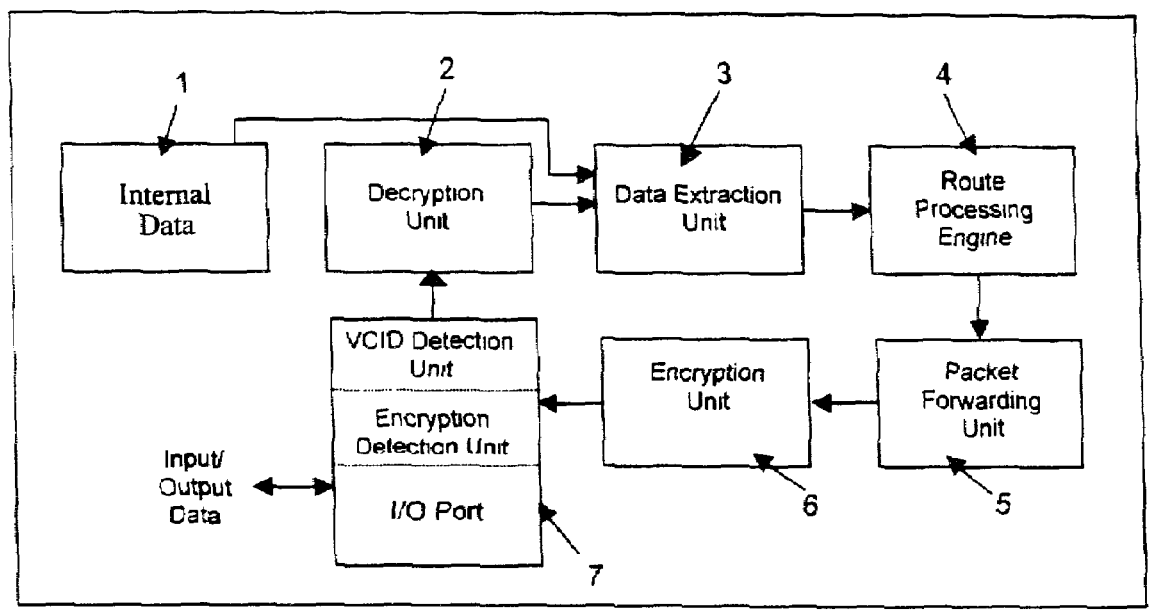
Figure 1. Representative Address Space Encryption

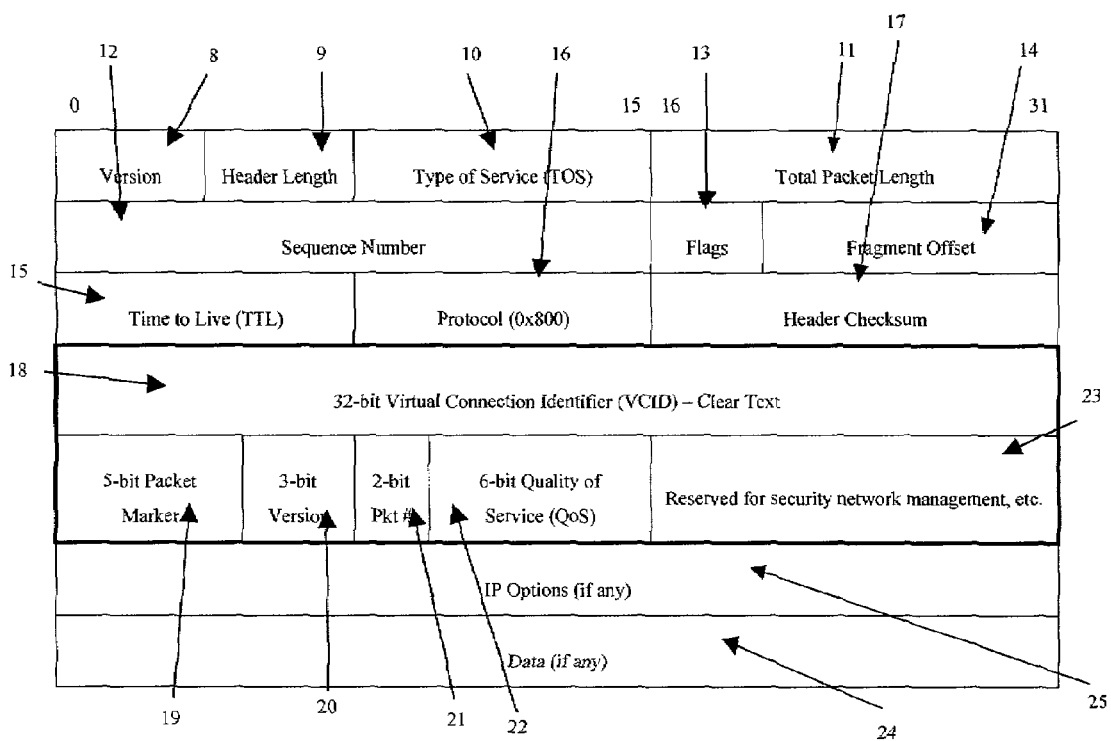
Figure 2. Representative IPv4 Header Details for VIPS Packet

ENCRYPTION MECHANISM IN ADVANCED PACKET SWITCHING SYSTEM

FIELD OF THE INVENTION

Present invention relates to data communications, and more particularly, to encryption mechanism for high-speed switching systems to switch packets over corporate networks and the Internet using Internet Protocol (IP) suite of protocols.

BACKGROUND OF THE INVENTION

Switching of packets entails end-to-end, connection-oriented sequential flow of packets. For historical reasons, switching is also associated with high-speed transmission of packets. The current technologies that comprise switching are Asynchronous Transfer Mode (ATM) and Multiprotocol Label Switching (MPLS) protocols.

ATM switches packets in layer 2 after it segments or fragments each IP packet. ATM segments each IP packet at the ATM network ingress node when the IP packet is larger than 48 Bytes and adds a 5 Byte ATM header that provides for ATM addressing and payload type. ATM reassembles the segmented packets into IP packets at the point where the ATM packets need to be converted to IP. This Segmentation and Re-assembly (SAR) process is generally considered too processing intensive and non-scalable at 2.4 Gbps and above. In this process of transmission and packet handling, ATM provides no security to the addressing fields and other contents of the packet through any encryption methodologies. Thus, anyone collecting the ATM packets can regroup the packets by ATM path identifiers and then by IP addresses to collect the information in the payloads of the original packets. ATM is now only associated with high-speed core networks and thus cannot provide end-to-end security.

The other mechanism for packet switching, Multiprotocol Label Switching (MPLS), switches packets by labeling each IP packet for a given type explicit-path associated with a flow. This path is set up end-router to end-router within a network. MPLS requires a processing-intensive label management system or server to allocate labels at each router, node or switch for each packet in each flow. The protocol does not solve the inherent problems of security in its packet switching methodology. MPLS does not provide any encryption methodologies and also has security issues due to the requirement of centralized label management and associated single-point-of failure risks. The explicit path set-ups are limited to the perimeter of a network of MPLS routers. This does not allow extending MPLS to the end-user devices from the network edge and therefore cannot deliver security all the way to the end devices.

SUMMARY OF THE INVENTION

The mechanism described in the present application involves encryption-decryption of the sensitive source and destination addresses and other related variables in the IP packet header. The methodology is related to switching IP with address translation that replaces the original source and destination IP addresses with hop-by-hop virtual connection addresses.

If a hacker were to collect packets from various flows on a link, he could not decipher which packets belong to which source or destination due to selective encryption of the IP source and destination information, and possibly of the related other packet processing information such as service level, network management and level of security.

The methodology described in this patent application involves the switching of IP packets as described in my copending patent application Ser. No. 09/973,884, filed Oct. 11, 2001, entitled "ADVANCED SWITCHING MECHANISM FOR PROVIDING HIGH-SPEED COMMUNICATIONS WITH HIGH QUALITY OF SERVICE" and incorporated herewith by reference. Switching of IP, also identified as switched IP in this patent, delivers a connection-oriented flow of IP packets. It replaces the IP packet routing mechanism with a switching mechanism in layer 3, or IP layer of the 7-layer Open System Interconnection (OSI) stack. Switching of IP is accomplished by replacing the IP source and destination addresses with locally significant virtual connection (VC) addresses for switching of packets—different from the conventional routing of packets. The virtual connection identifiers (VCIDs) are generated by each IP device also called a node, switch or router in this patent. The switching still uses the routes available from routing table built by the common routing protocols, such as Open Shortest Path First (OSPF), Routing Information Protocol (RIP), Intermediate System-to-Intermediate System (IS-IS), etc. The VCIDs are used for packet transmission to the next device.

A table of VCIDs are maintained in a switching table much like routes are maintained in a routing table. Routing or route tables built by the routing protocols comprise routes to all routers in the network whether a packet flow uses them or not. Such route tables are therefore large and the associated route look up is slow. The IP device has to find for every packet a route to the next router in the general direction of the destination. The switching table, on the other hand, comprises only the VCIDs for the flows in progress and as such is a much shorter table which makes the route look-up much quicker a process.

The first packet or the lead packet in a flow of IP packets has to carry the original IP source and destination addresses as well as the VCID address for all the IP devices involved in a flow to maintain the correlation of the two addresses—IP and VCID. This allows route look-up for the first packet from the route table based on the original destination IP address, and then enables getting a corresponding destination VCID, which can be a sequential number. The VCID is used to transmit the packet over a VC. The VCID is inserted and maintained in a switching table for use for follow-on generic packets. The generic packets do not contain the original source and destination IP addresses but only the VCIDs.

For complete protection of the original IP source and destination addresses, they are encrypted the first time a VCID is generated for them; the VCID itself is kept unencrypted. Some of the other fields in the 64-bit address space are encrypted as well except for the Packet Marker and Packet Number that remain in the clear text, that is, they are not encrypted.

Still other aspects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF THE DRAWINGS

FIG. 1 is a block diagram illustrating an encryption/decryption mechanism of the present invention.

FIG. 2 is a diagram illustrating format of Virtual IP (VIP) packet in accordance with the present invention.

DESCRIPTION OF THE INVENTION

A set of mechanisms is presented as an example in FIG. 1 for the process of the present invention. The process components that execute the methodology of the present invention representatively comprise Decryption Unit [2], Data Extraction Unit [3], Route Processing Engine [4], I/O Port [7], Encryption Unit [6] and Packet Forwarding Unit [5].

The process components shown here can be individual systems, a combination of systems, or more dispersed systems and sub-systems. The methodology or processes involved are independent of the operating system in the physical device and can use IP software or related packet processing hardware components. Thus, a real-time operating system such as embedded LINUX in a network processor or a general-purpose operating system, such as FreeBSD in a general-purpose router, IP-smart server or other IP devices—each can comprise and use the mechanisms described in this patent. The systems can also all be in hardware configuration such as network processors, application specific integrated circuits (ASICs) or field programmable gate arrays (FPGAs).

In the text below, if it is said that any of the encryption mechanisms execute a function or processes a parameter, it means that the associated software and/or hardware executes the function or processes the parameter for the desired end result.

[1] Internal Data

This identifies no hardware or software component but rather a mode of flow of data generated by an application running in the machine for implementing the mechanism of the present invention.

[2] Decryption Unit

This component decrypts the IP header address and other fields and then passes the IP packet to the Data Extraction Unit [3]. Although shown as a single unit, this unit can be two or more separate systems.

[3] Data Extraction Unit

This component extracts relevant header information from the decrypted IP header address fields of the Lead packet. For data generated internally, it executes a read function similar to the one it executes for packet coming in from the Decryption Unit [2]. The read function reads the bits in the packet header to determine the values of the IP address and other parameters. The difference between the external and internal data at this point lies in the IP addresses only. The internal packet shows the same machine address in which this unit is located, while the external data shows a different machine address.

[4] Route Processing Engine

This system component determines the best route possible for the data traffic. This system component is not an essential part for encryption-decryption in that the encryption mechanism as presented in this application does not depend on any route processing engine for encryption or decryption.

[5] Packet Forwarding Unit

This component helps transmit outgoing packets by placing them on the proper outgoing queue mechanism. Like the Route Processing Engine [4], this component is not an essential part for encryption-decryption in that the encryption mechanism as presented here does not depend on any packet forwarding unit for successful execution of encryption or decryption.

[6] Encryption Unit

In direct contrast to the Decryption Unit [2], this component encrypts the required IP header address and other fields before the packet is handed over to the I/O port for transmission out of the device. Although shown as a single unit, this unit can be two or more separate systems.

[7] I/O Port

This is the physical port of the device that houses the transmission electronics for processing outgoing and incoming packets. This is where the device driver software modules take care of putting on the layer 1 and 2 headers before transmitting them out. For the incoming packet, this is where the headers for layers 1 and 2 are taken out. This port has an encryption detection unit that detects if the packet is encrypted or not, and a VCID detection unit to determine the VCID value. Once these tasks are completed, the IP packet is handed over to the Decryption unit [2]. Although shown as a single unit, this unit can be two or more separate systems.

The mechanisms described here above work in unison, one following the other, when packets arrive—whether from within the device because an application running on the device desires to send one or more packets out, or from outside the device because the packets were meant for this device as the destination or because the packet was in transit through this device to another external device.

The packet and data processing in these system and subsystems work with Virtual IP Switching (VIPS) as described in my copending patent application Ser. No. 09/973,884, filed Oct. 11, 2001, entitled "ADVANCED SWITCHING MECHANISM FOR PROVIDING HIGH-SPEED COMMUNICATIONS WITH HIGH QUALITY OF SERVICE" and incorporated herewith by reference. Switched IP comprises physical port to physical port virtual circuits, connections or channels (VCs) as presented in the switched IP patent application. The VC identifiers, called VC IDs, or VCIDs for short, replace the address space bits in the original IP source and destination address spaces. The contents in this space include such parameters as VC destination address, quality of service (QoS) or service level, network management, encryption or authentication keys, and any other relevant parameters that the device implementers desire.

In FIG. 2 below, a representative format of the Virtual IP (VIP) packet is shown. The VIP packet is used in the VIPS system. The descriptions given below and those of other VCID elements, relate to the descriptions provided in the above-referenced patent application titled, "ADVANCED SWITCHING MECHANISM FOR PROVIDING HIGH-SPEED COMMUNICATIONS WITH HIGH QUALITY OF SERVICE". Where the description of the same item differs from that in the referenced patent application, the description below supersedes that in the referenced patent application.

At least the Packet Marker [19], and Packet Number [21] must be in the clear text, that is, unencrypted. The Version [20] can optionally be in clear text but does not have to be. These are detailed below for reference.

The Packet Marker [19]

The Packet Marker comprises the first 5 bits in the original IP source or destination address space. It is representatively shown in the original IP destination address space. The Packet Marker field consists of a bit pattern of all binary ones (1's) to distinguish a switched IP packet from a conventional IP packet. The Packet Marker needs to be in the clear text to identify the packet as a switched IP packet.

The Version [20]

Next to the Packet Marker field is the VIPS Version field that consists of 3 bits. The Version field specifies the version number of the VIP header. The version number value is allowed to go only up to 6 to prevent the possibility of generating a broadcast packet with all binary 1s as the first octet. However, where this limitation does not exist, all three Version [20] bits can be 1s.

The Packet Number [21]

The Packet Number representatively comprises 2 bits. This field identifies the packet type. For example, binary 01 identifies Lead packet encrypted, 11 Generic packet encrypted, 10 Lead packet unencrypted, and 00 Generic packet unencrypted.

When VIP address encryption is used, the 5-bit Packet Marker [19] and the Packet Number [21] bits are not encrypted as a minimum. Conversely speaking, the Packet Marker and the Packet Number bits remain unencrypted as a minimum.

Encryption is required typically in the Lead packet that carries the original IP source and destination addresses. Encryption of original source and destination IP addresses is meant for adding a layer of security to the packet in transit.

The encryption algorithms can be any of the implementer's proprietary algorithms. The only constraint would be to ensure that the encrypted bits fit the available space in the IP header's 64-bit address space. This would typically be 54 bits of space since the clear text for the Packet Marker [19], Version [20], Packet Number [22] would require 10-bit space. This allocation of space will vary for different VCID and other parameter bit assignments.

This is how the encryption processing takes place.

A packet received from another device is processed first by the I/O Port [7] as shown in FIG. 1. The I/O Port [7] first determines if the received packet is a VIP packet or a conventional IP packet by checking the Packet Marker [19]. If it is a VIP packet, it then checks if the packet is a Lead packet or a Generic packet and also if it is encrypted by examining the Packet Number [21]. If the packet is a VIP Lead packet, showing encrypted address fields, the packet is passed on to the Decryption Unit [2]. If it is not a VIP Lead packet but a Generic VIP packet, then the packet contains a VCID in the original IP Source address filed. The VCID Detection Unit in the I/O Port actually performs the detection of the VCID. If the packet is not a VIP packet, it is considered to be a typical IP packet and handled by the applicable common IP protocols in the application layer of the OSI stack in the device. So two main activities take place here, the encryption and VCID detections for a VIP packet.

The Decryption Unit [2] first decrypts any encrypted bits. From the Decryption Unit [2], the Data Extraction Unit [3] extracts the decrypted data that comprise the original source and destination IP addresses and VCID as available. The Route Processing Engine [4] uses the information extracted by the Data Extraction Unit [3] to determine the best route for the packet based on the destination IP address and any other relevant requirements such as network management and security requirements. The Route Processing Engine [4] builds a new, outgoing VCID for the available best route and then passes all of the information with the data payload to the Packet Forwarding Unit [5].

The Packet Forwarding Unit [5] packages the new VCID, QoS, and any new network management and security information along with the original IP source and destination addresses as packet and then queue it as a string of bits in the applicable queue, as decided by the time sensitive service or QoS parameter, and passes them to the Encryption Unit [6] ready for encryption of the packet header fields, as required, prior to transmission.

Based on the information in the Packet Number, the Encryption Unit [6] encrypts the original source and destination IP addresses but not the outgoing VCID [18], the Packet Marker [19] and the Packet Number [21]. This Encryption Unit [6] may encrypt other parameters in the 64-bit address fields if so desired by the implementer.

The methodology or key used for encryption by Encryption Unit [6] and decryption by Decryption Unit [2] can be a private key under local control of the network operator, shared by a pair of IP devices or routers, or a private key shared by the source and destination and all devices in between. It can also be a public key shared by many in a network of IP devices. The key for encryption is handled as desired by the network or device owners and operators.

For example, the key between two or more IP devices could be like this: shuffle all first 32 bits of each IP address by making last bit first and first bit last, and then add binary 0001 to them from the right end or starting with the least significant bit (LSB).

Assume only original IP source and destination addresses have to be encrypted. Using the IP destination address of 153.31.16.9, the corresponding binary address would be—
10011001 00011111 00010000 00001001
The end-to-end shuffled address would be—
10010000 00001000 11111000 10011001
After adding 0001, the final encrypted address becomes—
10010000 00001000 11111000 10011010
The final encrypted value so obtained may or may not be an IP address but in no case will it appear like the original address and thus could not be deciphered.

The encryption does need to be an elaborate key since there are over 4 billion possible ways of changing a 32-bit IP address though the most preferred choices include changing the network address, that is, the first 8 to 24 bits in the Classes A to C type addresses. Bit manipulations such as the use of logical AND, OR functionalities, or simply binary adding or subtracting bits such that original bit arrangements can be recovered with decryption provides many more choices.

For example, in the above address, the first 12 bits could have been shuffled and then too in alternate pairs of 2 bits instead of all 12 bits contiguously. The bits of 00010001 could have been added instead of only 0001. Also, to add more encryption complexity, all bits could have been changed by taking 1's complement of the bits, that is, converting all 1's into 0's and all 0's into 1's.

The encryption key has to be loaded in the IP device before this mechanism of encryption is activated. The encryption key is loaded in each IP device by the network operator or the IP device user. It can also be propagated to two or more devices from a central station. The methodology used will be the common methods used in usage of encryption keys. Such key can also be in the header of the Lead packet in VCID space and may itself by encrypted by another encryption key.

The I/O Port finally puts in the layer 1 and 2 header and then transmits the packet out.

In case of an internally generated packet, there is no decryption required. The processing for the locally generated packet in these systems is similar to that for the packet received from an external source.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A packet switching system comprising:
   a packet identifying unit for detecting a virtual connection identifier (VCID) marker indicating that a VCID is provided in a portion of an incoming Internet Protocol (IP) packet allocated for IP address fields,
   an encryption detecting unit responsive to the incoming IP packet for determining whether at least a section of the portion of the incoming packet allocated for IP address fields comprises encrypted data, and
   a decrypting unit responsive to the encryption detecting unit for decrypting the encrypted data, if the encrypted data is detected, to produce decrypted data.

2. The system of claim 1, further comprising a data extracting unit for extracting the VCID from the decrypted data.

3. The system of claim 2, wherein the data extracting unit is configured for extracting original source and destination IP addresses from the decrypted data.

4. The system of claim 3, wherein the data extracting unit is configured for extracting from the decrypted data a Quality of Service (QoS) field for identifying parameters of Quality of Service.

5. The system of claim 4, wherein the QoS field includes a Class of Service for identifying parameters of Class of Service.

6. The system of claim 5, wherein the data extracting unit is configured for extracting security and management parameters from the decrypted data.

7. The system of claim 6, further comprising a route processing engine responsive to the data extracting unit for determining a route for forwarding the packet.

8. The system of claim 7, further comprising a packet forwarding unit responsive to the route processing unit for placing the packet into a queue for transmission.

9. The system of claim 8, wherein the encrypting unit is configured for encrypting only packets transmitted to a network that uses virtual connection identifiers for switching packets.

10. The system of claim 9, wherein the encrypting unit is configured for encrypting the original source and destination IP addresses.

11. The system of claim 9, wherein the encrypting unit is configured for encrypting the QoS field.

12. The system of claim 9, wherein the encrypting unit is configured for encrypting the security and management parameters.

13. A method of switching packets comprising the steps of:
   detecting a virtual connection identifier (VCID) marker indicating that a VCID is provided in a portion of an incoming Internet Protocol (IP) packet allocated for IP address fields,
   inspecting the incoming IP packet to determine whether at least a section of the portion of the incoming packet allocated for IP address fields comprises encrypted data, and
   if the encrypted data is detected, decrypting the encrypted data to produce decrypted data.

14. The method of claim 13, further comprising the step of extracting the VCID.

15. The method of claim 14, further comprising the step of extracting original source and destination IP addresses from the decrypted data.

16. The method of claim 15, further comprising the step of extracting from the decrypted data a QoS field for identifying parameters of Quality of Service.

17. The method of claim 16, wherein the QoS field includes a Class of Service for identifying parameters of Class of Service.

18. The method of claim 16, further comprising the step of extracting security and management parameters from the decrypted data.

19. The method of claim 18, further comprising the step of determining a route for forwarding the packet.

20. The method of claim 19, further comprising the step of placing the packet into a queue for transmission.

21. The method of claim 20 further comprising the step of encrypting at least an element of data provided in the portion of the packet allocated for IP addresses, after the step of placing the packet into a queue for transmission.

22. The method of claim 21, wherein the step of encrypting is carried out for encrypting only packets transmitted to a network that uses virtual connection identifiers for switching packets.

23. The method of claim 22, wherein the step of encrypting comprises encrypting the original source and destination IP addresses.

24. The method of claim 22, wherein the step of encrypting comprises encrypting the QoS field.

25. The method of claim 22, wherein the step of encrypting comprises encrypting the security and management parameters.

* * * * *